(12) United States Patent
Ito et al.

(10) Patent No.: US 7,991,205 B2
(45) Date of Patent: Aug. 2, 2011

(54) BIOMETRICS DEVICE

(75) Inventors: Kazutaka Ito, Nagoya (JP); Mitsunari Kanou, Seto (JP)

(73) Assignee: Hitachi-Omrom Terminal Solutions, Corp., Tokyo (JP)

( * ) Notice: Subject to any disclaimer, the term of this patent is extended or adjusted under 35 U.S.C. 154(b) by 1071 days.

(21) Appl. No.: 11/819,331

(22) Filed: Jun. 26, 2007

(65) Prior Publication Data

US 2008/0123905 A1   May 29, 2008

(30) Foreign Application Priority Data

Jun. 26, 2006   (JP) ................................ 2006-175006

(51) Int. Cl.
G06K 9/00 (2006.01)
(52) U.S. Cl. ....................................... 382/124; 713/186
(58) Field of Classification Search .................. 382/115, 382/124, 125, 126; 713/186
See application file for complete search history.

(56) References Cited

U.S. PATENT DOCUMENTS

| | | | |
|---|---|---|---|
| 7,113,622 B2 * | 9/2006 | Hamid | 382/124 |
| 7,254,255 B2 * | 8/2007 | Dennis | 382/115 |
| 7,271,881 B2 * | 9/2007 | Arnold et al. | 356/71 |
| 7,480,397 B2 * | 1/2009 | Ide | 382/124 |
| 7,508,964 B2 * | 3/2009 | Hamid | 382/125 |
| 7,689,013 B2 * | 3/2010 | Shinzaki | 382/124 |
| 7,773,778 B2 * | 8/2010 | Kato | 382/115 |
| 2003/0090154 A1 * | 5/2003 | Takezaki et al. | 307/10.2 |
| 2004/0057605 A1 * | 3/2004 | Kono et al. | 382/115 |
| 2005/0047632 A1 * | 3/2005 | Miura et al. | 382/124 |
| 2005/0111708 A1 * | 5/2005 | Chou | 382/124 |
| 2005/0286744 A1 * | 12/2005 | Yoshizu et al. | 382/115 |
| 2006/0047970 A1 * | 3/2006 | Mochizuki | 713/186 |
| 2006/0095491 A1 * | 5/2006 | Abe | 708/400 |
| 2006/0177107 A1 * | 8/2006 | Ishii | 382/115 |
| 2007/0022303 A1 * | 1/2007 | Awatsu et al. | 713/186 |
| 2008/0123905 A1 * | 5/2008 | Ito et al. | 382/115 |

FOREIGN PATENT DOCUMENTS

| | | |
|---|---|---|
| JP | 04-199376 | 7/1992 |
| JP | 2005-168627 | 6/2005 |
| JP | 2005-234653 | 9/2005 |
| JP | 2005-235049 | 9/2005 |
| JP | 2005-253989 | 9/2005 |
| WO | WO 2005/069212 A1 | 7/2005 |

OTHER PUBLICATIONS

Japanese Office Action issued in Japanese Patent Application No. 2006-175006, mailing date Aug. 17, 2010.

* cited by examiner

*Primary Examiner* — Gregory M Desire
(74) *Attorney, Agent, or Firm* — McDermott Will & Emery LLP

(57) ABSTRACT

A device includes a supporting mechanism which movably supports a living body, light sources which emit near infrared rays, an imaging unit which picks up venous images of the living body with light emitted from the light sources and an image processing unit which processes venous images picked up by the imaging unit, wherein the imaging unit picks up a plurality of still images consecutively from the living body which travels supported by the supporting mechanism and the image processing unit forms an image pattern of the living body by subjecting the obtained plurality of still images to processing.

2 Claims, 8 Drawing Sheets

FIG.12A
FIG.12B
FIG.12C
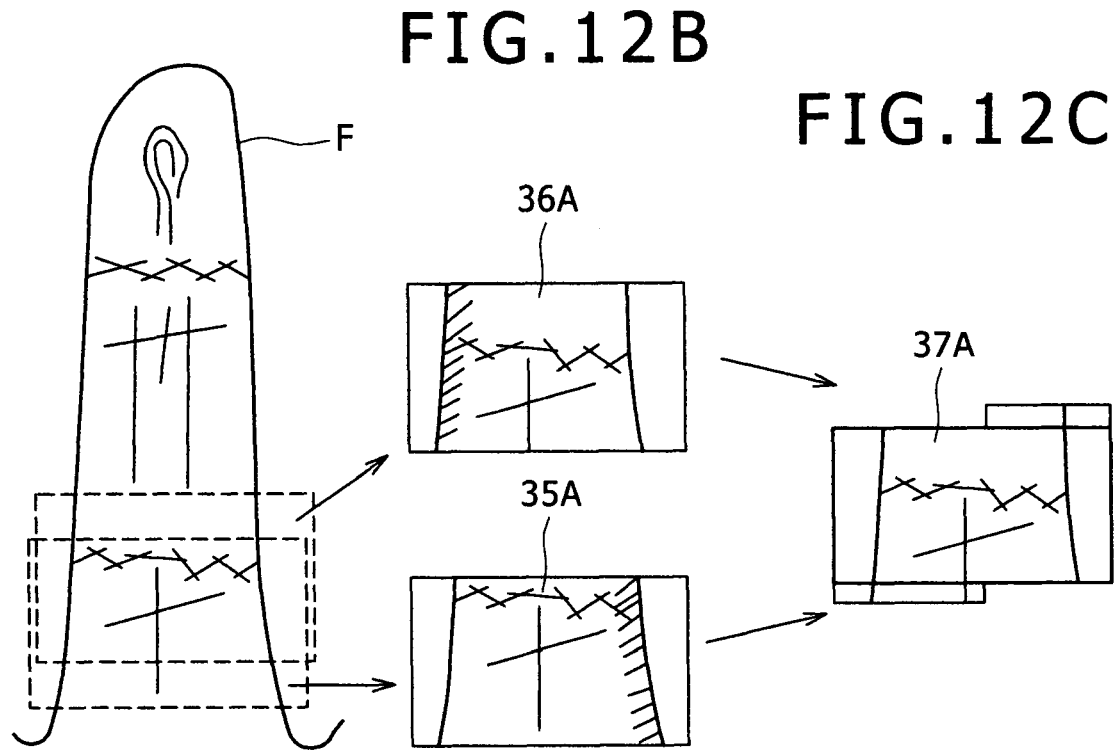
FIG.13A
FIG.13B
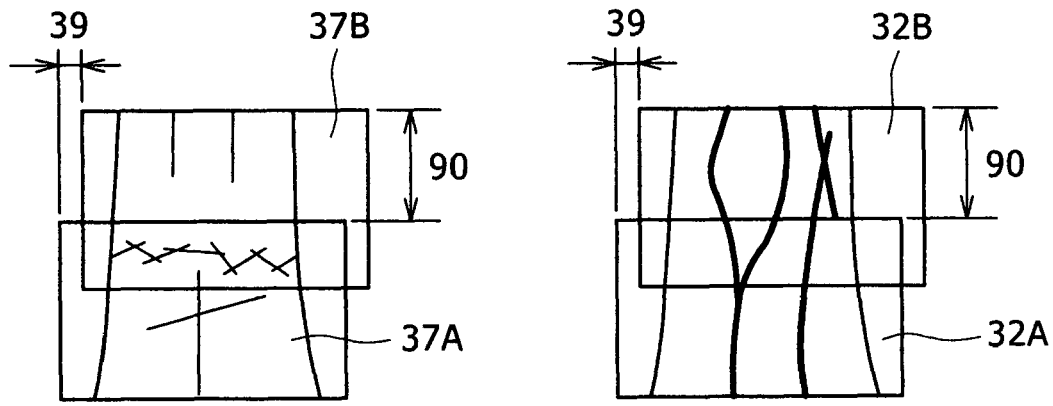

BIOMETRICS DEVICE

BACKGROUND OF THE INVENTION

The present invention relates to a biometrics device, and more particularly to a vein authentication device which authenticates individuals by use of venous information obtained by sweeping finger veins.

Development of authentication devices as a technique for authenticating individuals by use of biometric information is making progress, and such devices are now coming into practical use in PCs, mobile terminals, automatic telling machines (ATMs) and automobiles. The working principle of vein authentication devices is that a living body is irradiated with near infrared rays, and the rays which are scattered within the body and later transmitted outside the body are formed into a biometric image. As hemoglobin in the blood absorbs near infrared rays, it emerges in the formed image as a dark shadowy pattern, and thereby enables veins to be recognized as such shadowy patterns. A vein authentication device authenticates an individual by computing the correlation between the imaged pattern and a pertinent pattern in biometric information images registered in advance.

Known vein authentication devices as such include, for instance, those disclosed in JP-A-253989/2005 (Patent Reference 1) and JP-A-235049/2005 (Patent Reference 2).

Conventional vein authentication devices inevitably have to be structured in larger dimensions than the living objects because of the need to acquire overall information on the objects to be measures. However, larger authentication devices are correspondingly more costly and may be restricted in mounting convenience. Therefore, more compact vein authentication devices are called for.

SUMMARY OF THE INVENTION

An object of the present invention is to provide a less expensive and more compact biometrics device.

Another object of the invention is to provide a vein authentication device which, when biometric information is to be acquired by having a living body sweep, can provide a constant venous image pattern even if the sweeping velocity varies.

Preferably, the invention is configured as a biometrics device including a supporting mechanism which movably supports a living body, light sources which emit near infrared rays, an imaging unit which picks up venous images of the living body with light emitted from the light sources and an image processing unit which processes venous images picked up by the imaging unit, wherein the imaging unit picks up a plurality of still images consecutively from the living body which travels supported by the supporting mechanism and the image processing unit forms an image pattern of the living body by subjecting the obtained plurality of still images to processing.

In a preferable example, the supporting mechanism has a roller over which a finger is to be placed and a lead screw which turns interlocked with the roller, the lead screw is illuminated with light from the light sources, and the imaging unit obtains still images of the lead screw and venous images of the finger.

Preferably, predetermined positions on the lead screw are marked, and the image processing unit, computing travel distances of the finger with reference to those marks in the still images obtained, processes combination of each plurality of still images of the finger obtained from the imaging unit by use of the computed travel distances.

Another preferable example of the invention is configured as a biometrics device including a supporting mechanism which movably supports a living body, light sources which emit near infrared rays, reflective light sources which are arranged in a substantially horizontal direction, an imaging unit which picks up a plurality of venous images and a plurality of surface images of the living body while alternately causing the reflective light sources and the light sources of near infrared rays to emit light, and an image processing unit which computes travel distances of characteristic points of the surface images from the plurality of surface images obtained and processes combination of the plurality of venous images into a single image pattern. Preferably, it is further equipped with a luminous energy adjusting unit which adjusts the luminous energy of the reflective light sources arranged in a substantially horizontal direction, wherein, after the luminous energy outputs of the reflective light sources have been stabilized, the imaging unit picks up and acquires an image of the finger for authentication processing.

According to the invention, since it enables image information on a living body to be acquired processed while moving it, a low-cost and compact vein authentication device can be realized. Further, a constant venous image pattern can be obtained even if the sweeping velocity varies.

BRIEF DESCRIPTION OF THE DRAWINGS

Preferred embodiments of the present invention will now be described in conjunction with the accompanying drawings, in which:

FIGS. 12A to 12C are intended for use in the description of the generation of a finger surface image in the second embodiment of the invention; and FIGS. 13A and 13B illustrate how a venous image of a finger is formed from its surface image in the second embodiment of the invention.

DESCRIPTION OF THE PREFERRED EMBODIMENTS

Preferred embodiments of the present invention will be described below with reference to the drawings.

First, the first preferred embodiment of the invention will be described with reference to FIGS. 1 through 7B.

Figure 1:
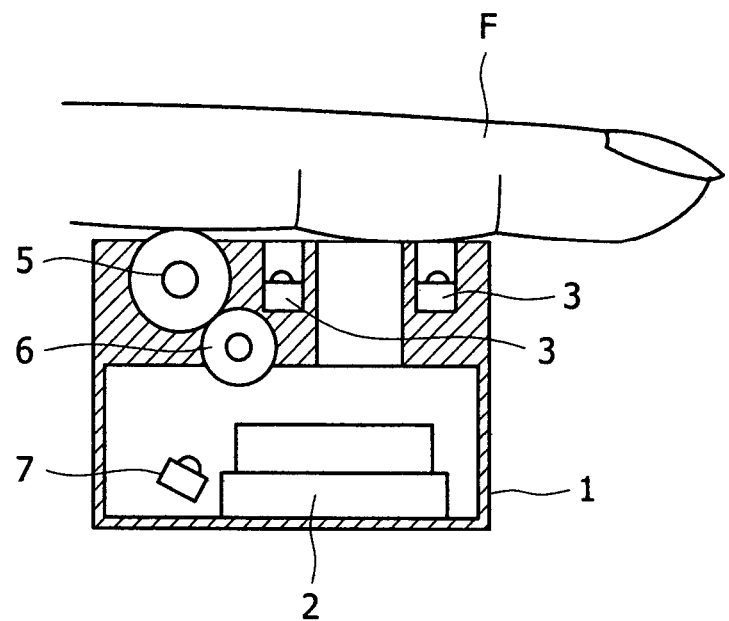
FIG. 1 shows a profile of an image input unit 1 of a vein authentication device, which is a first embodiment of the invention.
Figure 2:
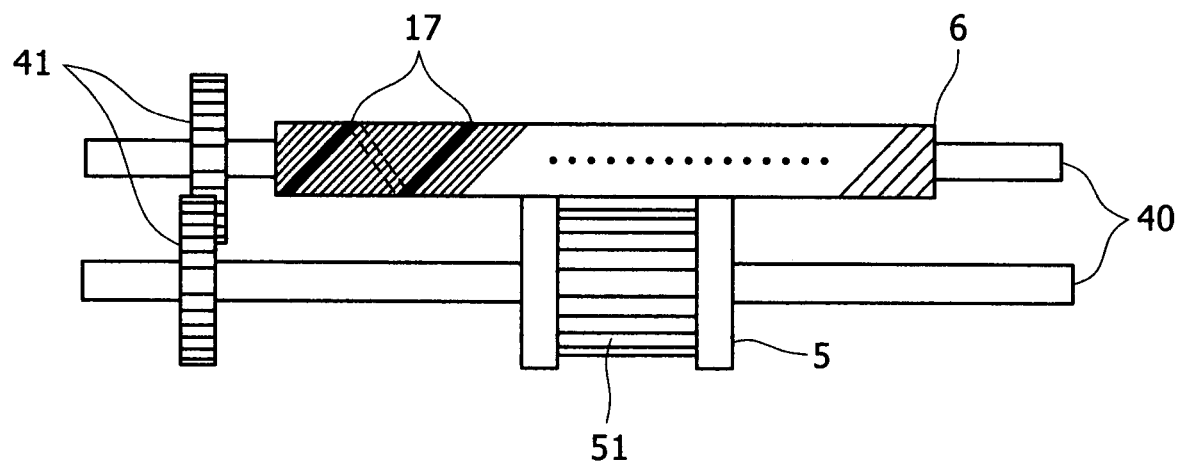
FIG. 2 shows the internal structure of the image input unit 1 in the first preferred embodiment of the invention.

FIG. 1 shows a profile of the image input unit 1 of a vein authentication device and FIG. 2 shows its plan. The image input unit 1 has light sources 3 arranged in two positions and emitting near infrared rays, an imaging unit 2 which picks up venous images of a finger F with light from the light sources 3, a roller 5 which turns mounted with the finger F, a lead screw 6 which turns interlocked with this roller 5, and an auxiliary light source 7 which illuminates the lead screw 6.

Figure 5:
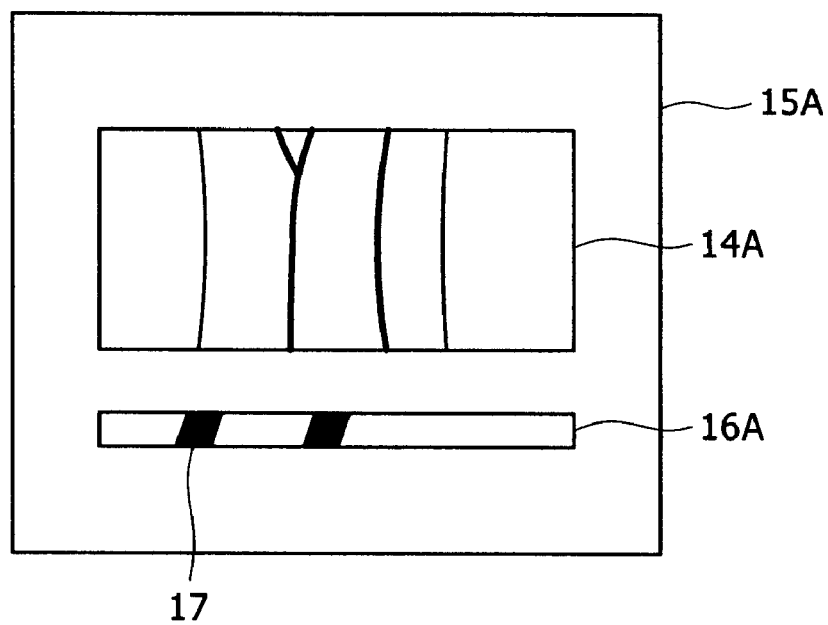
FIG. 5 shows an initial input screen in the first embodiment of the invention.

As shown in FIG. 2, the structure is such that the roller 5 and the lead screw 6 are fixed to their respective rotation shafts 40 parallel to each other and are mutually interlocked via linking gears 41. The lead screw 6 is provided with colored grooves 17 at prescribed intervals to clearly measure the sweep quantity. These grooves 17 are colored black and do not reflect the light from the auxiliary light source 7. Other grooves do reflect the light from the auxiliary light source 7. In the input images, the colored grooves 17 are seen as black images as shown in FIG. 5.

It is preferable here for the widthwise shape of the roller 5 to be substantially equal to the width of the finger F to be placed over it. This enables the placing position of the finger F of the object to be clearly defined and the sweep of the finger F to be guided to linearity. Also, grooves 51 matched in shape with the finger F are formed in the roller 5, and these grooves 51 can prevent veins from being flattened.

Incidentally, though two light sources 3 are arranged in the illustrated case to pick up clear venous images, one light source 3 will suffice if proper images can be obtained.

Figure 3:
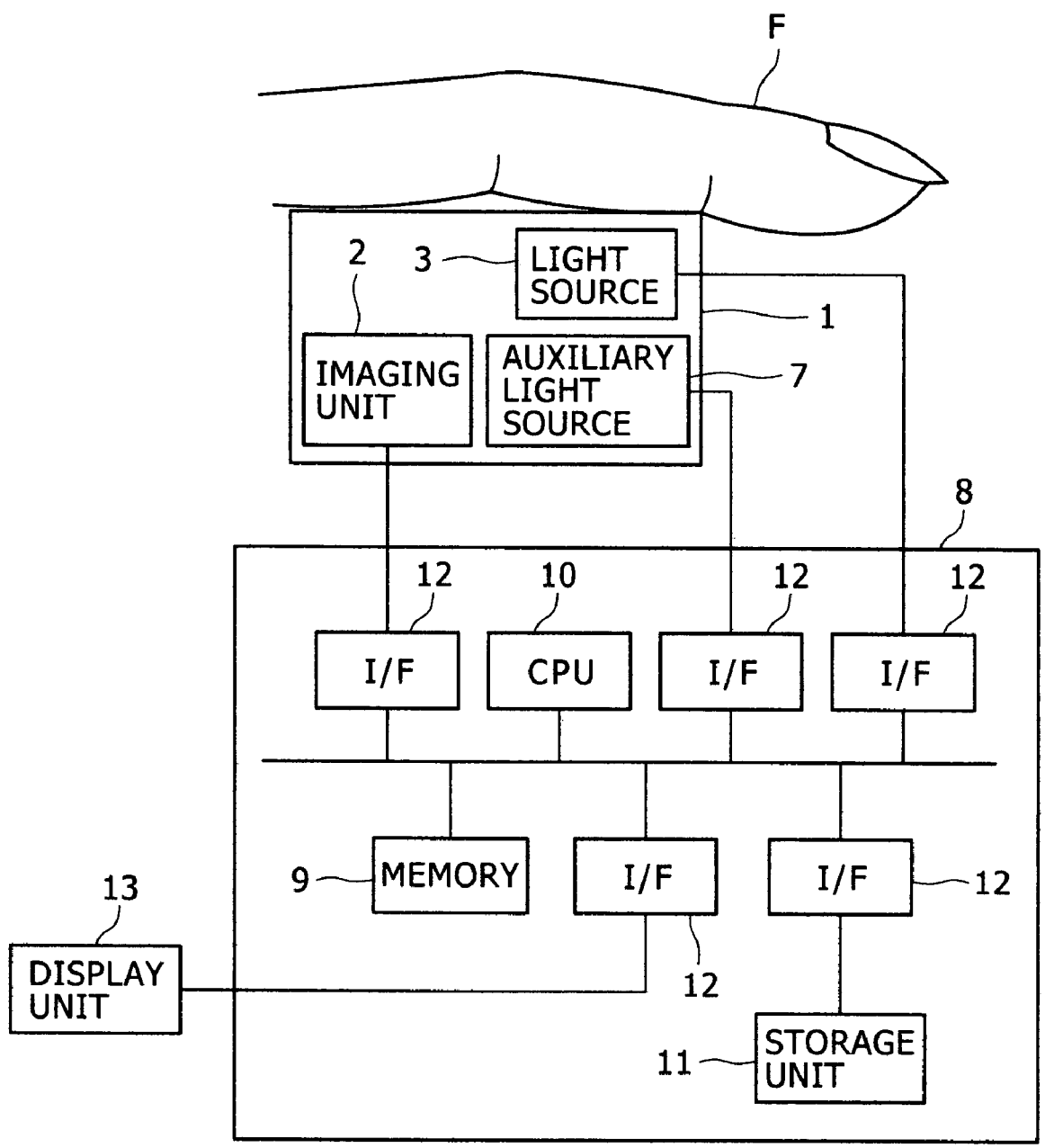
FIG. 3 is a configurational diagram of the vein authentication device, which is the first embodiment of the invention.

As shown in FIG. 3, the vein authentication device is configured of an image input unit 1 and an authentication processing unit 8. The authentication processing unit 8 has a CPU 10, a memory 9, a storage unit 11, a display unit 13 and interfaces 12. The CPU 10 here performs various processing functions by executing programs stored in the memory 9. The functions of these programs will be described afterwards. The memory 9 also stores image data acquired by the imaging unit 2. The storage unit 11 stores predetermined venous image data. The interfaces 12 connect the imaging unit 2, the storage unit 11 and the image input unit 1.

The display unit 13 is connected to the authentication processing unit 8 to display situations including the result of authentication. Incidentally, this display unit 13 is dispensable. Where it is dispensed with, the result of authentication is made known by an alarm and the like.

Figure 4:
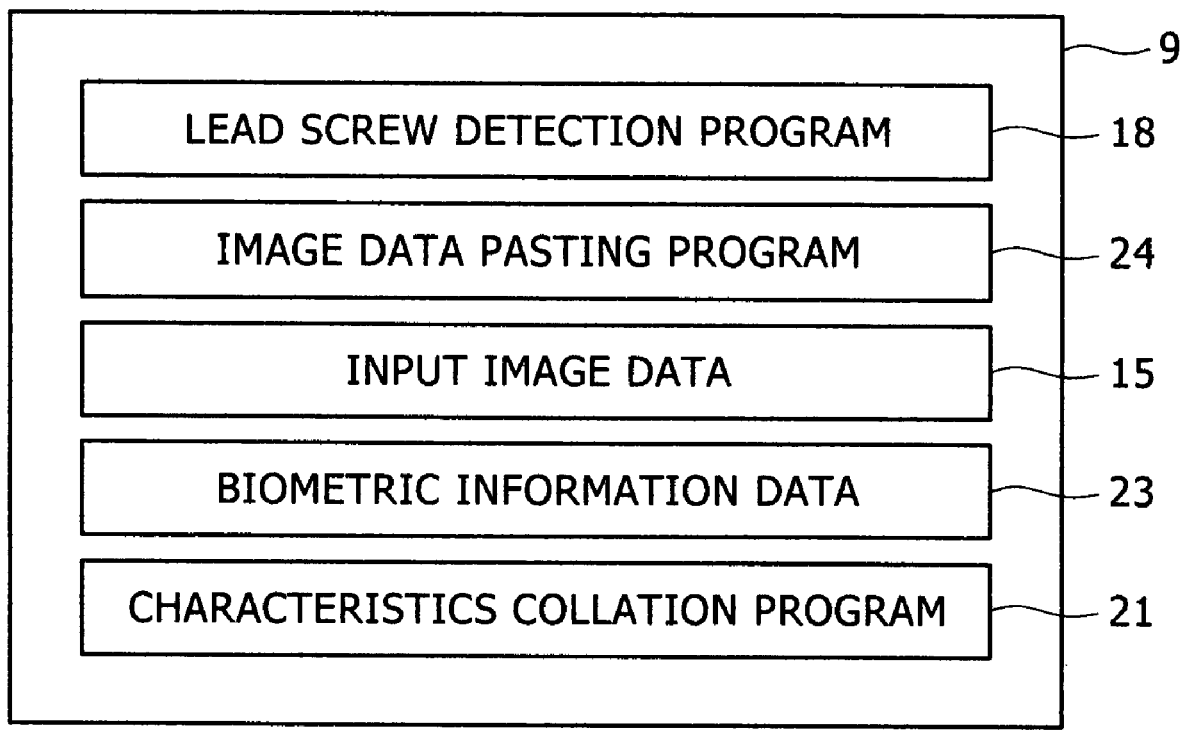
FIG. 4 shows contents stored in a memory 9 of an authentication processing unit 8 in the first embodiment of the invention.

FIG. 4 shows the stored contents of the memory 9 of the authentication processing unit 8.

The programs stored in the memory 9 include a lead screw detection program 18 for detecting and computing the quantities of variation of the lead screw image, an image data pasting program 24 for composing (pasting together) a biometric image on the basis of the quantities of variation computed according to the lead screw detection program 18, and a characteristics collation program 21 for extracting characteristics of biometric information data 23, collating them with a group of characteristic data registered in the storage unit 11 in advance and determining whether or not the biometric information data 23 is valid. The sets of data stored include input image data 15 and the biometric information data 23.

Next, the authentication processing by the vein authentication device of this embodiment will be described with reference to FIGS. 5 through 7B.

As the image picked up from the initial state, an image of the lead screw 6 is picked up keeping only the auxiliary light source 7 lit. In this state, the positions of the grooves 17 in the lead screw 6 are detected and monitored by the authentication processing unit 8. Next, when the finger F is placed over the roller 5, the image of the grooves 17 picked up by the imaging unit 2 varies. By causing the authentication processing unit 8 to recognize this, the light sources 3 are lit to start vein authentication processing. Or, it may be recognized by the method disclosed in Patent Reference 2 that the relative brightness of the input image has surpassed or fallen below a threshold, and the light sources 3 are lit accordingly.

When the light sources 3 are lit, the finger F is irradiated with near infrared rays. The light scattered within the finger F is picked up as an image 15A containing a venous image 14A and a lead screw image 16A by the imaging unit 2 (FIG. 5). The picked-up image of the finger is stored into the area for the input image data 15 in the memory 9 as the initial input image via the interface 12. Correspondingly to this image 15A, the CPU 10 is caused to store the venous image 14A into the area for the biometric information data 23, and at the same time the positions of the grooves 17 of the lead screw image 16A are recognized.

In this while, the finger of the object is traveling over the roller 5 from its position in the initial state.

Figure 6:
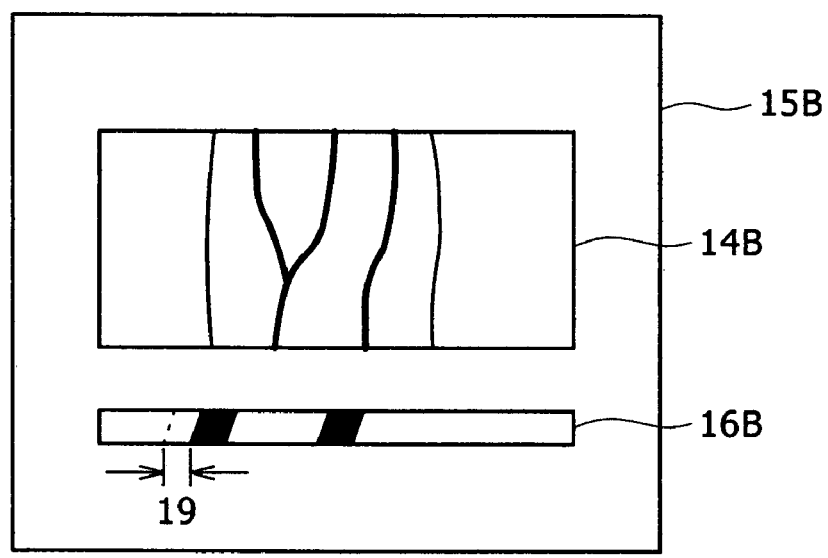
FIG. 6 shows an input image after a finger has traveled away in the first embodiment of the invention.
Figures 7A, 7B:
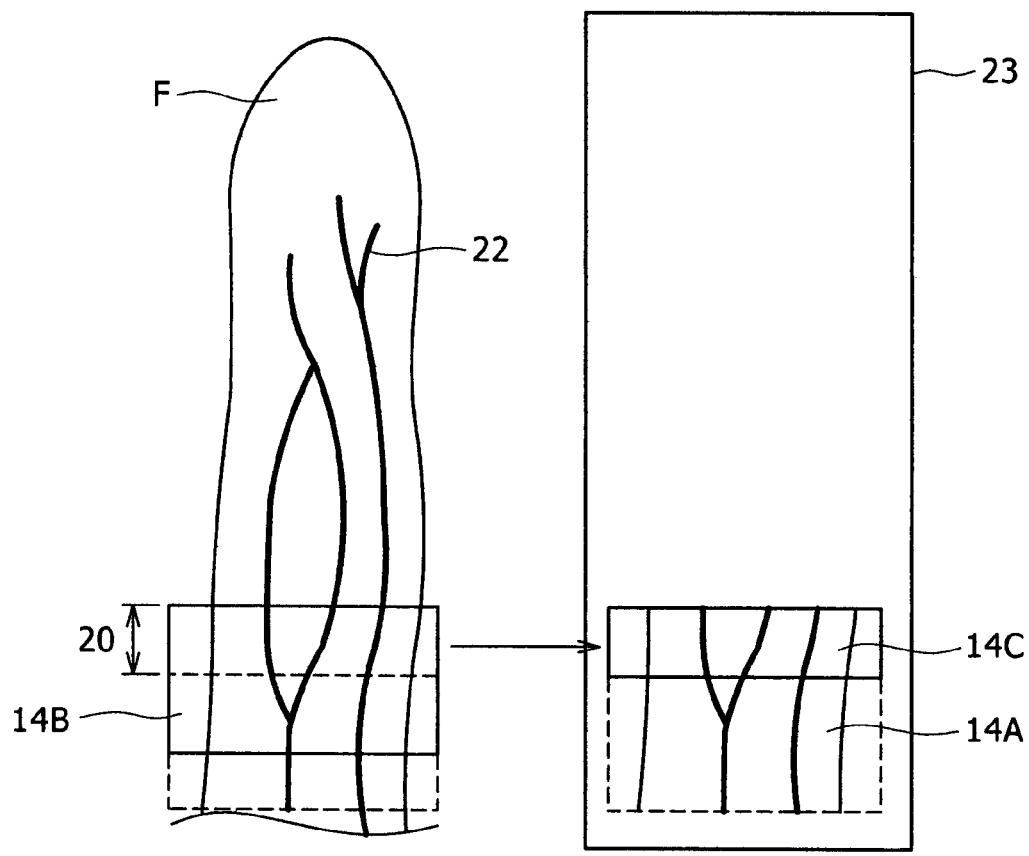
FIGS. 7A and 7B are intended for use in the description of vein image pasting in the first embodiment of the invention.

An image 15B to be picked up next is an image after a travel relative to the initial image 15A. This image 15B is shown in FIG. 6.

The CPU 10 cuts a lead screw image 16B out of the image 15B, detects a travel distance 19 of the grooves 17 and computes the travel distance 20 (FIGS. 7A and 7B) from the initial venous image 14B. A venous image 14C equivalent to the travel distance 20 is thereby pasted onto the biometric information data 23. As the state of the pasted biometric information 23 shown in FIG. 7B indicates, the earlier image 14A and the subsequently acquired image 14C are pasted together.

This processing is executed in the following manner. For instance, input image data (n) are inputted, and a lead screw image 16(n) is cut out of the input image data (n). Next, it is compared with a lead screw image 16 (n−1) and a travel distance 19(n) is detected. And a travel distance 20(n) is computed from the travel distance 19(n), and a venous image 14(n) in input image data 15(n) is cut out in an equivalent to the travel distance 20(n) for the biometric information data 23 (n−1) and pasted onto a venous image 14 (n−1). After that, the processing shifts to inputting of input image data (n+1).

As the travel distance 19 of the grooves 17 here is in direct proportion to the travel distance 20 from the venous image 14A to the venous image 14B, the CPU 10 can process pasting by merely performing simple computation of adding or subtracting the overlapping part of the pasting. This enables the required computation of the travel distances of images to be significantly reduced. Further, it is made possible, when pasting the venous image 14C, to correct the pasting position of the venous image 13C by comparing and collating the remaining part of the venous image 14B after the removal of the venous image 13C with the venous image data 14A stored in the biometric information 23, thereby enabling more accurate image pasting to be processed.

By repeating the processing described so far, venous information 22 on the whole finger F which is the object is stored into the biometric information data area 23. This processing makes it possible to check whether or not the generated biometric information data 23 matches the pertinent person by executing the characteristics collation program 21 and thereby comparing and collating it with a pattern stored in the storage unit 11.

Next, a second embodiment of the present invention will be described with reference to FIG. 8 and subsequent drawings.

Figure 8:
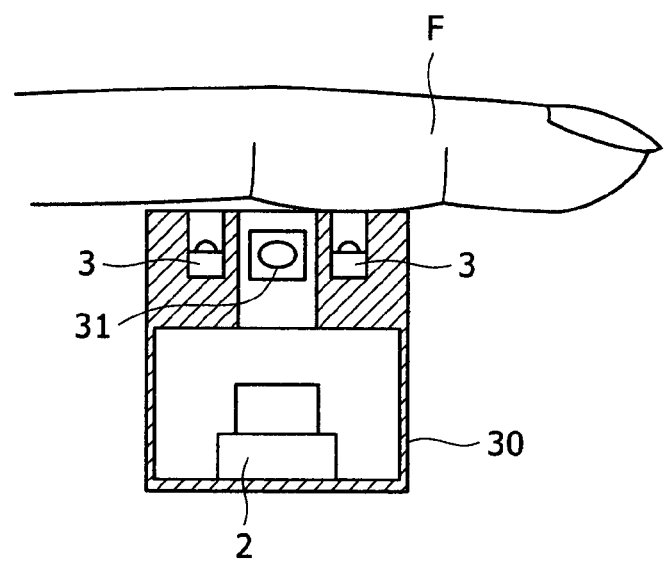
FIG. 8 shows a profile of the image input unit 1 in a second preferred embodiment of the invention.

As shown in FIG. 8, the second embodiment of the invention has reflective light sources 31 for a living body in its image input unit 30. Compared with the image input unit 1 shown in FIGS. 1 through 3, it has the same configuration as the vein authentication device of the first embodiment except for the absence of the auxiliary light source 7, and the same parts will be assigned respectively the same reference signs. Duplication of a description will be dispensed with.

Figure 9:
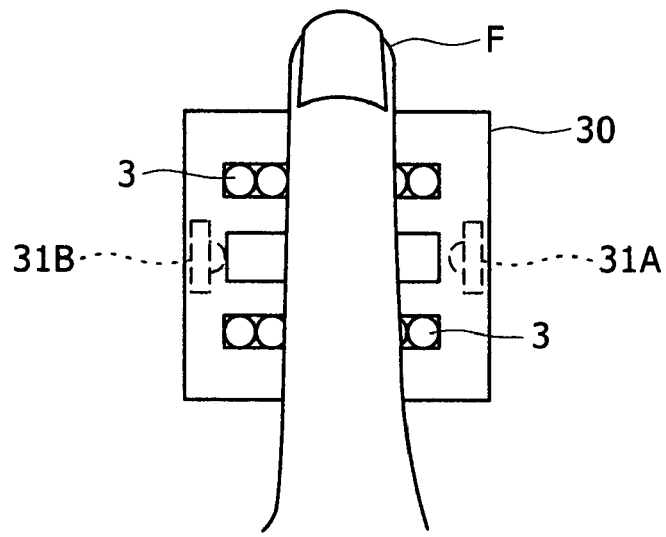
FIG. 9 shows a top view of the image input unit 1 in the second preferred embodiment of the invention.

As shown in FIG. 9, in order to more clearly image the shades of the unevenness of the finger F, reflective light sources 31A and 31B using visible light are arranged in a substantially horizontal direction. The reflective light sources 31A and 31B enables a surface image of the finger F to be picked from both right and left by alternately irradiating the finger. Whereas it is preferable for the reflective light sources 31 here to be long-wavelength blue LEDs in order to obtain the surface image of the finger F clearly, other visible light may as well be used if the image can be obtained clearly.

Figure 11:
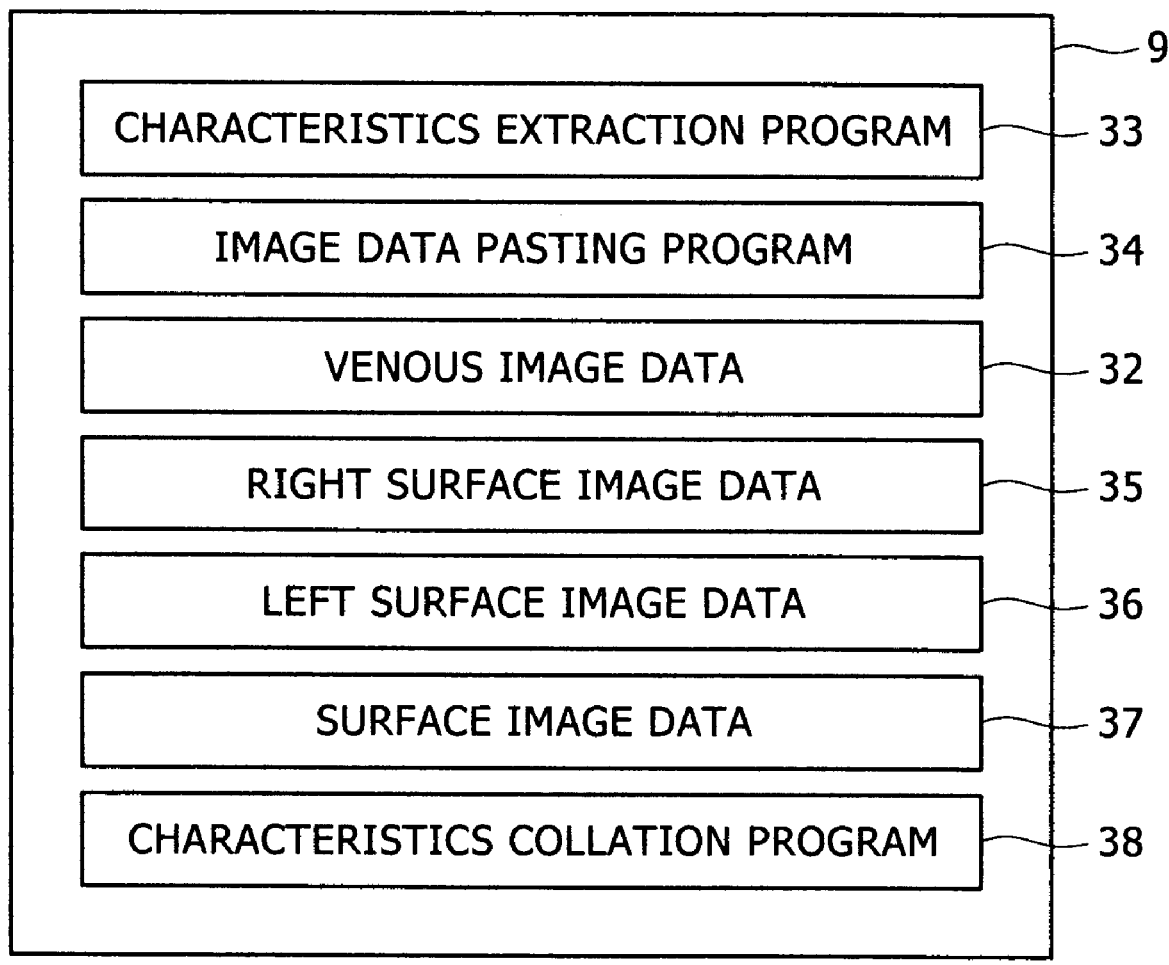
FIG. 11 shows contents stored in the memory 9 of the authentication processing unit 8 in the second embodiment of the invention.

As a surface image is obtained by irradiation from the two reflective light sources 31A and 31B, areas for right surface image data 35 and left surface image data 36 are also secured for the data to be stored in the memory 9 as shown in FIG. 11.

Figure 10:
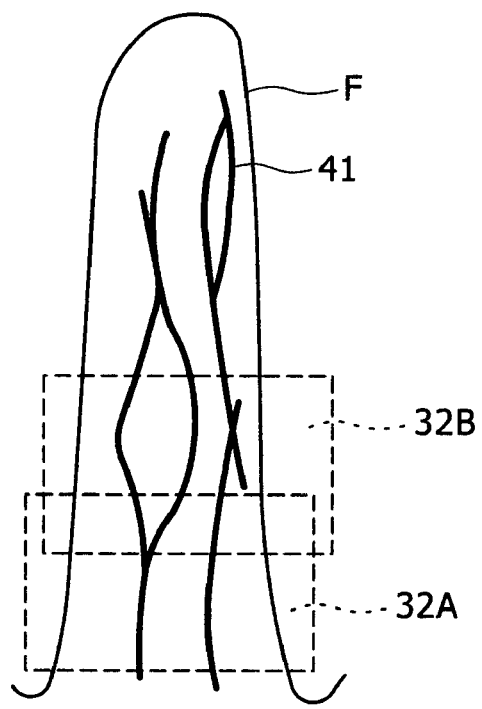
FIG. 10 shows a venous image of a finger in the second embodiment of the invention.

FIG. 10 shows acquired finger vein image data, wherein reference sign 32A denotes venous image data inputted for the n-th time and 32B denotes venous image data inputted for the (n+1)-th time.

FIG. 11 shows the stored contents of the memory 9.

A characteristics extraction program 33 extracts characteristic points of input images (venous image, right surface image and left surface image). An image data pasting program 34 realizes the function of detecting the travel distance of image data from the characteristic points extracted from the characteristics extraction program 33, correcting the travel distance and pasting the image data.

Right surface image data 35 stores the right half of the image, and left surface image data 36 stores the left half. Surface image data 37 stores image data resulting from the processing to correct the travel distance of the image according to the characteristic points of the right surface image 35 and of the left surface image 36 which have been cut out.

The venous image data 32 stores data after the processing to paste an image equivalent to the travel distance cut out of the venous image 32B onto the venous image 32A. For instance, this processing is accomplished by computing the travel distance 39 in the x-axis direction and the travel distance 90 in the y-axis direction by comparing the characteristic points of a surface image 37A which constitutes the n-th input image and of a surface image 37B which constitutes the (n+1)-th input, cutting an image equivalent to the travel distance out of the venous image 32B and pasting it onto the venous image 32A.

A characteristics collation program 38 compares a finger vein image 41 finished by the image data pasting program 34 with a group of characteristic data registered in the storage unit 11 in advance, and determines whether or not the finger vein image 41 is valid.

Next, a method of acquiring the venous image of the finger F using this embodiment will be described.

When the finger F is placed over the image input unit 30, the finger F is imaged first with the light sources 3 and the reflective light sources 31A and 31B. The authentication processing unit 8 checks whether or not the contour of the finger F can be distinguished or whether or not the image is free from halation, and the optimal luminous energy is set for each light source.

After this setting has been completed, the light sources 3 are lit to pick up a one-frame equivalent of the venous image 32A, which is stored into the venous image data 32 in the memory 9 via the interface 12, and the CPU 10 processes extraction of characteristics of the venous image data. Next, the light sources 3 are turned off, the reflective light source 31A is turned on to pick up a one-frame equivalent of a surface image 35A, which is stored into the right surface image data 35 in the memory 9 via the interface 12, followed by similar processing to extract characteristics.

Then, the reflective light source 31A is turned off, and the reflective light sources 31B to pick up a one-frame equivalent of a surface image 36A, which is stored into the left surface image data 36 in the memory 9 via the interface 12 to be subjected to processing to extract characteristics. Since there is a time lag equivalent to one frame between the right surface image data 35 and the left surface image data 36, the lag is compensated for by collating characteristic points extracted from the respective central parts of the images of the right surface image data 35 and the left surface image data 36. Further, the center is extracted from the finger contour of the left right surface image, and the surface image 37A of the finger F can be formed by pasting together the right half of the right surface image 35 and the left half of the left surface image 36 (FIGS. 12A to 12C).

By repeating the processing described so far, the venous images 32B and the surface images 37B of the second and subsequent frames can be obtained. How this is accomplished is shown in FIGS. 13A and 13B. Since more characteristics can be extracted here from a surface image than from a venous image, by comparing the surface images 37A and the surface images 37B with the sweeping method, the travel distance 90 of the finger F in the vertical direction can be computed. Further, as the travel distance 39 in the horizontal direction, which is the positional lag in the right-and-left direction, can also be detected on the basis of contour extraction or detected data of characteristic points of the finger F, it is made possible to paste together the venous image 32A and the venous image 32B with high accuracy after the venous images by use of this data and pasting them together.

Since the travel distance can be consecutively computed from the surface images of the finger F by repeating the processing described so far, it is made possible to obtain venous images matching the computed travel distances, to obtain the overall venous image and characteristic point data of the finger F with high accuracy by pasting them together, and thereby to acquire overall venous image data 91 of the finger F to be authenticated. The overall venous image data 91 so acquired is compared and collated with a pattern stored in the storage unit 11 by executing the characteristics collation program 38. As a result of this collation, it can be checked whether or not the acquired venous image data 91 fits the legitimate person.

Further, when surface image information on the finger F is to be authenticated, if the travel distance can be adequately computed from only the left surface image or the right surface image, only one side image will suffice, and in this case, the cost can be saved and the time taken to process computation can be reduced.

This embodiment of the invention, since it requires no addition of any particular encoder mechanism and can measure the travel distance of sweeping by a living body, a low-cost and compact vein authentication device can be realized.

What is claimed is:

1. A biometrics device comprising:
a supporting mechanism which movably supports a finger;
a light source which emits near infrared rays to the finger moving on the supporting mechanism;
first and second reflective light sources arranged in a substantially horizontal direction of which the first reflective light source irradiates visible light to a right side of the finger moving on the supporting mechanism and the second reflective light source irradiates visible light to a left side of the finger moving on the supporting mechanism;

an imaging unit which images a plurality of venous images from the finger, a plurality of first surface images obtained from the right side of the finger and a plurality of second surface images obtained from the left side of the finger, while alternately causing the first and second reflective light sources and the light source of near infrared rays to emit light;

an image processing unit programmed to:
   compute travel distances of characteristic points of the plurality of first and second surface images obtained, and
   process the plurality of venous images into a single image pattern; and a luminous energy adjusting unit which adjusts the luminous energy of the first and second reflective light sources arranged in a substantially horizontal direction, wherein, after the luminous energy outputs of the first and second reflective light sources have been stabilized, the imaging unit picks up and acquires an image of the finger for authentication processing.

2. A biometrics device comprising:

a supporting mechanism which movably supports a finger;

a light source which emits near infrared rays to the finger moving on the supporting mechanism;

first and second reflective light sources arranged in a substantially horizontal direction of which the first reflective light source irradiates visible light to a right side of the finger moving on the supporting mechanism and the second reflective light source irradiates visible light to a left side of the finger moving on the supporting mechanism;

an imaging unit which images a plurality of venous images from the finger, a plurality of first surface images obtained from the right side of the finger and a plurality of second surface images obtained from the left side of the finger, while alternately causing the first and second reflective light sources and the light source of near infrared rays to emit light;

an image processing unit programmed to:
   compute travel distances of characteristic points of the plurality of first and second surface images obtained, and
   process the plurality of venous images into a single image pattern; and a luminous energy adjusting unit which adjusts the luminous energy of the first and second reflective light sources arranged in a substantially horizontal direction, wherein, after the luminous energy outputs of the first and second reflective light sources have been stabilized, the imaging unit picks up and acquires an image of the finger for authentication processing, and
   wherein the first and second reflective light sources are blue LEDs.

* * * * *